United States Patent Office 3,229,331
Patented Jan. 18, 1966

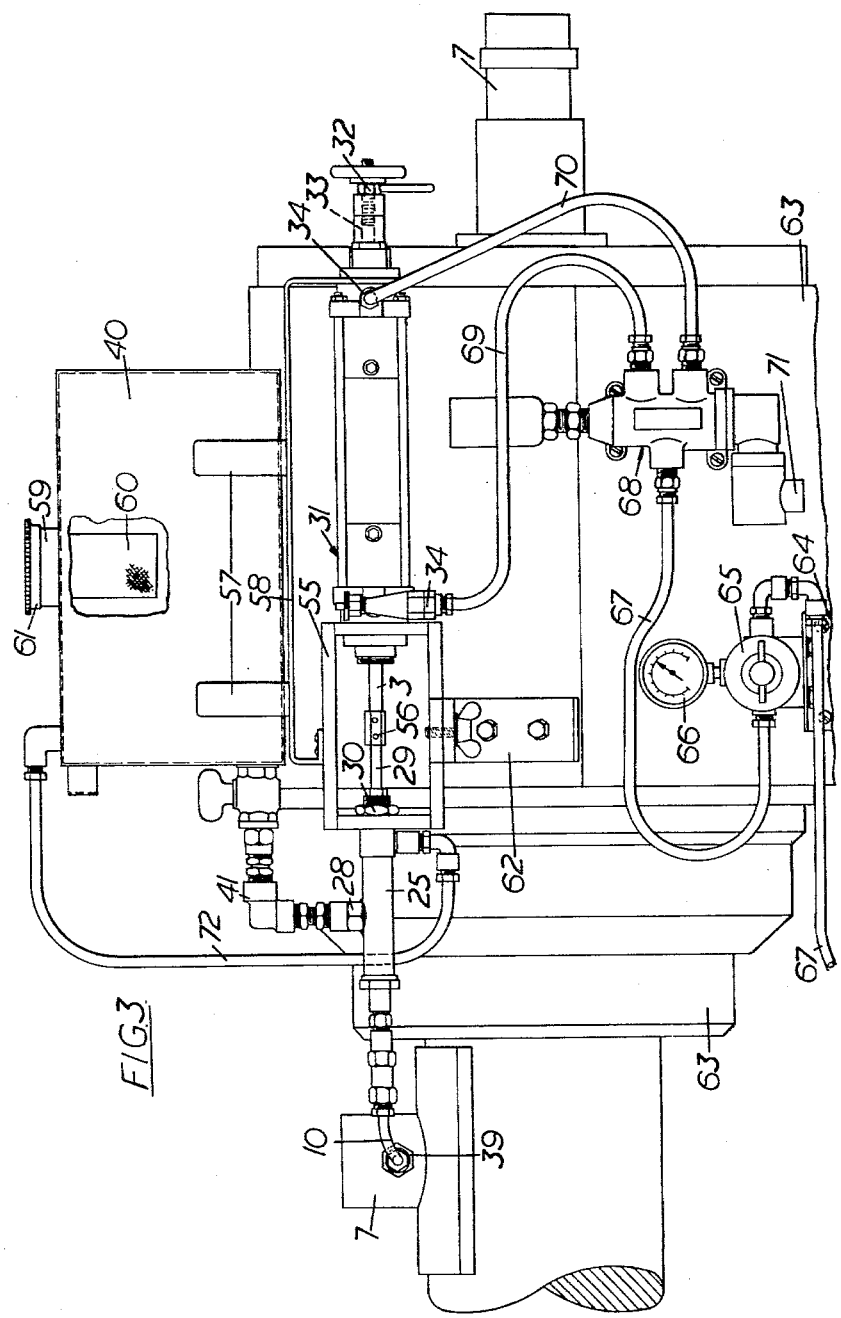

3,229,331
APPARATUS FOR MANUFACTURE OF PLASTIC SHOES AND OTHER ARTICLES OF FOOTWEAR
John Tusa, Horndon-on-the-Hill, Essex, and Roland H. Ellis, Basildon, Essex, England, assignors to Bata Shoe Company Inc., Belcamp, Md.
Filed Sept. 9, 1963, Ser. No. 307,543
Claims priority, application Great Britain, Sept. 19, 1962, 27,711/62
2 Claims. (Cl. 18—30)

This invention relates to apparatus for the manufacture of articles of footwear composed of or including plastic material, especially but not exclusively plastic shoes and shoes having plastic soles.

It is known to manufacture plastic shoes and other articles of footwear by the use of an injector with which co-operates a mold, or more usually an endless series of molds carried by a turntable or other conveyor, the arrangement being such that the mold or each mold is fitted with a core in the form of a last and is brought into register with the injector and plastic is injected in a fluid condition into the mold, in which the plastic solidifies following which the mold is displaced from the injector and opened, the article is removed from the last and the mold is closed again in readiness for the next injection.

The present invention is applicable to apparatus for manufacturing articles of footwear which comprises feeding plastisol under pressure into an injector, heating the plastisol in the injector to bring it first to a transient gel condition and then to the condition of a fused thermoplastic material in liquid condition, and then injecting the fused liquid material into a mold in which the material cools and solidifies in conformity with one or more surfaces of a last in positional relationship with members of the mold to form an article of footwear or part thereof. Such a process is referred to hereinafter and in the claims as "the process described." An example of the process described and of apparatus for performing it is disclosed in co-pending application No. 157,421 filed December 6, 1961.

An object of the present invention is to provide means whereby, in the process described, coloring material is introduced into the plastisol either in its passage to the injector or in the injector per se.

According to the invention, in the apparatus described there is included means for injecting predetermined quantities of coloring material into the plastisol prior to the latter being brought to a transient gel condition in the injector.

The coloring material may be injected into the plastisol prior to entry to the injector or alternatively it may be injected directly into the injector.

Preferably successive charges of the coloring material are injected into the plastisol in appropriately timed relationship with the operation of the apparatus.

In addition, means may be provided to maintain the coloring material under pressure.

Further according to the invention there is provided an apparatus for performing the process described, an injecting device for injecting predetermined quantities of coloring material into the plastisol.

The injecting device may be connected to a conduit for feeding the plastisol under pressure to the injector or alternatively may be connected directly to the injector.

Preferably, the injecting devices includes an injection chamber, a bore in said chamber, a plunger which is a sliding fit in said bore and enters through one end thereof, a non-return-valved connection between the other end of said bore and said conduit, inlet means for supplying coloring material to said injection chamber, and means for imparting injecting strokes to said plunger, whereby predetermined quantities of said coloring material may be injected through said non-return-valved connection into said conduit.

Preferably, means is provided for altering the stroke of the plunger so that the volume of coloring material injected during each injecting stroke may be varied.

Preferably also said means for imparting injecting strokes to the plunger is under the control of a timing mechanism, so that successive charges of the fluent material are injected into the plastisol in appropriately timed relationship with the working of the apparatus.

The inlet means is connectible to a container for the coloring material which container is preferably portable and attachable to and detachable from the inlet means. The container may have an outlet branch including a valve closes when the container is detached from the inlet means but which automatically opens whenever the outlet branch is coupled to the inlet means. The container may also be fitted with means for maintaining the coloring material under pressure.

An embodiment of the invention will now be described by way of example, with reference to the accompanying drawings in which:

FIG. 3 is an elevation of a commercial form of the injector shown in FIG. 2.

Figure 1:
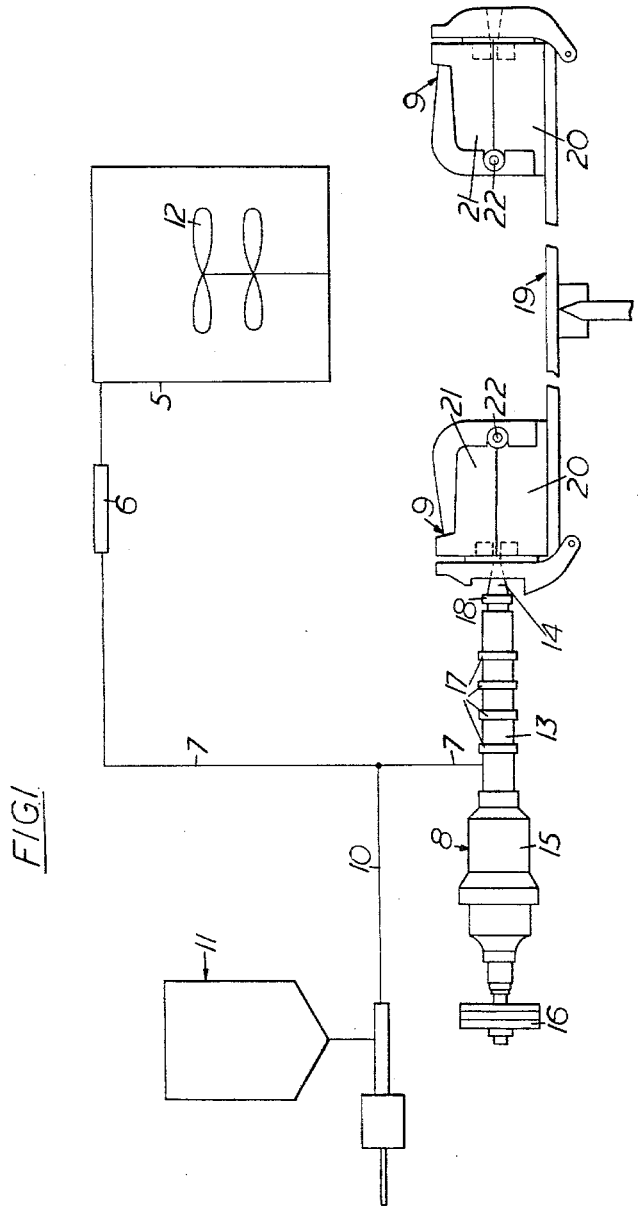
FIG. 1 is a schematic view of an apparatus for manufacturing articles of footwear.

Referring to FIG. 1, apparatus for manufacturing articles of footwear includes a mixer 5 to which ingredients for a fluent thermoplastic material are supplied. The thermoplastic material is pumped by a pump 6, through a conduit 7 to an injector 8 which injects the fluid into a mold 9 where it cools in contact with a last to form a complete molded article of footwear. Before entry to the injector coloring material is supplied to the thermoplastic material through conduit 10 from a color injector 11.

The mixer 5 is an unheated tank and includes rotatable paddles 12 for stirring the contents of the tank and maintaining them free from sedimentation.

The following constituents may be supplied to the mixer, namely: a polyvinyl chloride resin; a stabilizer selected to suit the resin; a plasticiser selected to suit the resin and the desired rate of gelling, for instance dialphanol phthalate. The constituents may also include thermoplastic waste material consisting of rejected previously molded sandals. Any of various stabilizers may be used, for instance a powder based on compounds of barium and cadmium; or a fluid based on compounds of barium, cadmium and zinc; or fluid chelating agents. The plasticizer is a fluid, the stabilizer is a powder or a fluid, and the waste material if included is usually granular. In operation, the thermoplastic mixture is brought by the mixer to a satisfactory fluid condition, the mixture now becoming a dispersion known as plastisol, and it is this ungelled fluid plastisol which is pumped under pressure into the injector.

The injector 8 includes a cylindrical barrel 13 into one end of which a rotatable feed-screw (not shown) extends and at the other end of which there is an injection nozzle 14. The shaft of the screw extends through a stationary supporting chest 15 to appropriate driving means such as a power-driven pulley 16. The shaft is supported by bearings protected from the plastisol by appropriate sealing means (not shown). The injector has an inlet branch located on the barrel, close to the driven end of the feed screw. The previously mentioned conduit 7 is connected to this branch.

The injector also includes heating means which comprises heating elements in the form of bands 17 fitted to the barrel 13 at intervals throughout its length and an additional band 18 fitted to the nozzle 14.

The apparatus also includes a step-by-step rotatable turntable 19 carrying several of the molds around 9, these being equiangularly spaced round the turntable and arranged to register one by one with the injector nozzle 14. Each mold 9 comprises a last as its core, a sole member, an upper side mold member and a lower side mold member. These mold members are detachable and replaceable fittings in parts of a mold box. One of the box parts 20 is a fixture on the turntable, the other parts 21 being separately pivotable about a hinge-pin 22. The several members of the assembly, when the box is closed, form a mold for the production of a sandal or other article of footwear and, when opened, expose the last for removal of the molded article, which it supports.

Figure 2:
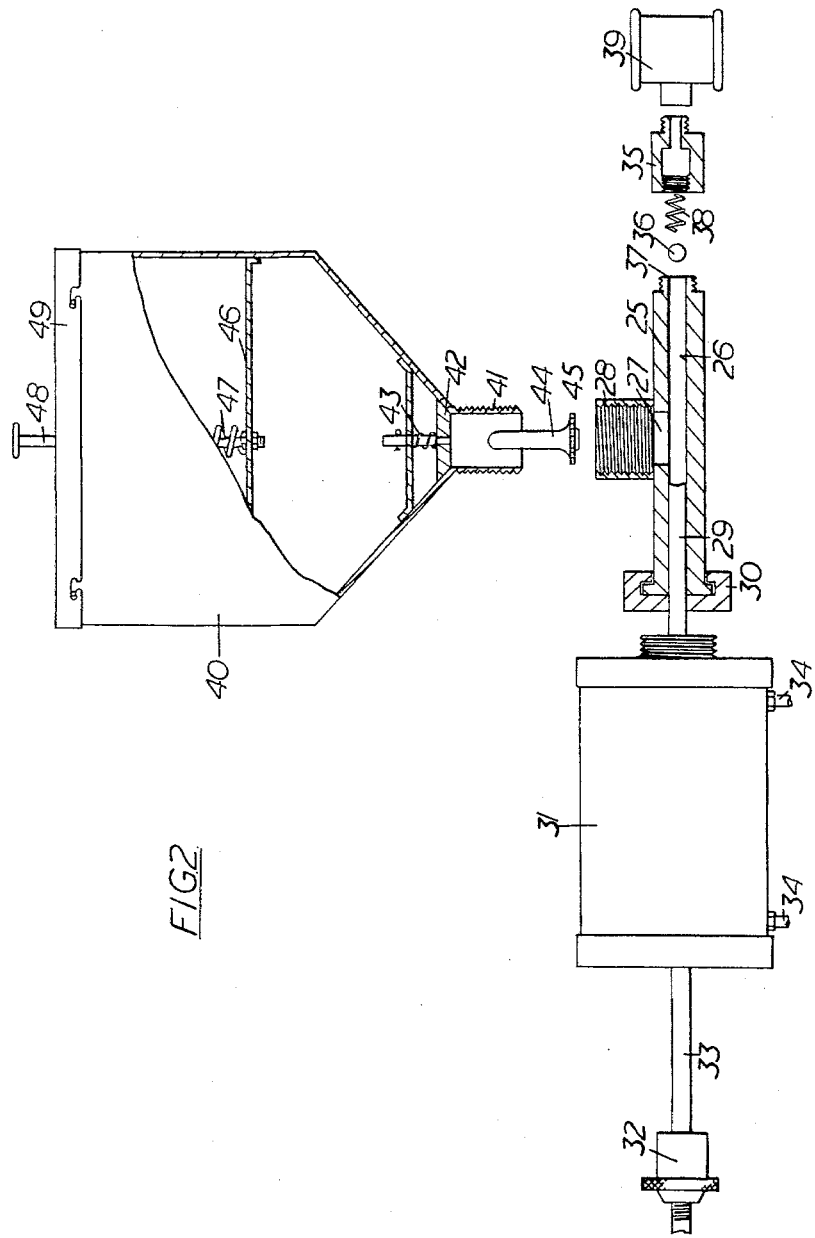
FIG. 2 is a detailed diagrammatic view, partly in section and partly in elevation of an injector, incorporated in such apparatus, some parts being shown detached from one another for clarity.

The color injector 11 is shown in greater detail in FIG. 2. It includes a tubular component 25 having a cylindrical bore 26 into which an inlet port 27 opens about midway of the length of the component 25. An inlet branch 28 on the component 25 registers with the port 27. A plunger 29 enters one end of the bore 26 through a gland nut 30, and is a close sliding fit in the bore. The plunger extends from a pneumatic piston-and-cylinder unit 31 the stroke of which is adjustable by a stop in the form of a nut 32 screwed on piston rod 33. The stroke of the piston-and-cylinder and consequently of the plunger 29 regulates the quantity of color injected from the injector 11 into the conduit 7. Connections 34 are provided for the supply and exhaust of compressed air to and from the piston-and-cylinder 31.

A valve chamber 35 is screwed on the component 25 at the outlet end of its bore 26. This chamber contains a ball valve 36 which normally is held closed against a seat 37 on the bore end by a spring 38. The valve chamber 35 is coupled to a union piece 39 which is connected in the conduit 7 of the apparatus shown in FIG. 1 to which the coloring-injecting device is applied.

A container 40 is connectible to the inlet branch 28. This container has an outlet branch 41 which can be screwed or otherwise coupled to the inlet branch 28. A valve 42 at the bottom of the container is urged by a spring 43 to close the outlet branch 41. A striker 44 located in the linet branch 28 is arranged to dislodge the valve 42 and hold it open whenever the container is coupled to the tubular component 25. The striker 44 has an open spider-form base 45 which sits upon the component 25 in register with the port 27. The container 40 is fitted with a piston-like plate 46 which is pressed downwards by a spring 47 and which is withdrawable upwards by a handled rod 48 which serves as a fluid level indicator and which is bolted to the plate 46 and is freely slidable through a central guide-hole (not shown) in lid 49 of the container 40. This spring-loaded plate 46 rests on the surface of the coloring material with which the container is filled and by maintaining this material under pressure forces the material rapidly to fill the bore 26 of the component 25 whenever the plunger 29 is withdrawn, as shown in FIG. 2.

In operation, the plastisol may in some cases be initially warmed, say to about 40° C., in the conduit 7 before admission to the injector barrel 13, but ordinarily pre-warming is not required. The delivery pressure may be about 400 pounds per square inch (about 25 to 30 kilograms per square centimeter) but under normal working conditions about half this pressure is adequate. In the barrel, the plastisol, now including the coloring material, is heated and passes progressively through three successive stages in its movement from the inlet to the nozzle 14 under the action of the rotating feed-screw. These stages are, firstly, a free-flowing condition in the vicinity of the first heating band 17 at approximately 70° C.; secondly, the condition of a soft gel in the vicinity of the second and third bands 17 at approximately 190° C.; thirdly, conversion of the gel in the vicinity of the fourth band 17 and also of the nozzle band 18 to the condition, at a somewhat reduced temperature of approximately 170° C., of a completely fused homogeneous thermoplastic liquid ready for injection. The frictional heat generated by the work of the feed-screw on the gelled plastisol assists the heating bands 17 in raising the temperature to the appropriate level. In addition, the rotation of the feed-screw ensures thorough mixing of the color with the plastisol.

At a timed instant in the operation of the turntable 19 with its mold 9, solenoid-operated valves cause the pneumatic unit 31 to force the plunger 29 through the bore 26. When the plunger end passes the port 27, the coloring material in the bore becomes highly compressed and therefore forces the ball valve 36 to open, so that a predetermined charge of the coloring material is introduced into the plastisol in the union 39. Thereafter, the solenoid-operated valves cause the unit 31 to withdraw the plunger 29 in readiness for the next discharge of coloring material.

In the embodiment shown in FIG. 3 parts already referred to are designated by the same reference numerals as used above. The piston rod 33 projects from both ends of the piston-and-cylinder unit 31. The end for connection to the plunger 29 extends into an open housing 55 and is connected to the plunger by a coupling 56. The container 40 is carried by a pair of brackets 57 secured to a support 58 which is mounted at its opposite ends on the piston-and-cylinder unit 31 and the housing 55 respectively. In this embodiment the spring-loaded plate 46 (FIG. 2) is not utilized, material being supplied to the container 40 through an inlet 59 and filter element 60. A cap 61 is provided to close the inlet 59. It has been found in practice that the pressure of the material in the container 40 is generally sufficient to force material into the injector, thus doing away with the need for the plate 46.

A bracket 62 secures the housing 55 to a base 63 through which the conduit 7, carrying plastisol from the mixer to the injector, passes. A further bracket 64 mounts an air inlet valve 65 and air pressure gauge 66 on the base 63. Air is supplied through a conduit 67, in which the inlet valve 65 is interposed, to a two-way valve 68 which controls supply and exhaust of air to and from the piston-and-cylinder unit 31 by way of conduits 69 and 70. Exhaust air is led away through an outlet 71. The two-way valve 68 is also mounted on the base 63.

A connection 72 is provided between the tubular component 25 and the container 40, this connection allowing for back pressure in the component 25 during reciprocation of the plunger thus reducing pressure at the gland nut 30.

In a modification, the molds may be designed to produce plastisol soles on pre-formed shoe uppers. Each of the molds has a cavity in the form of a sole formed by side mold members and a sole member, and the mouth of the cavity is sealed by a component of the eventual shoe or other like article of footwear, the component being a sack, or sock, including an upper and insole stitched or otherwise secured together and being supported by a last in appropriate positional relationship with the other mold members, so that the lasted component serves as the closure of the mold cavity. The component may be composed wholly or partly of leather or textile or other appropriate fabric. The mold cavity has an inlet with which the nozzle of the injector is registrable and through which the plastisol is injected, thereafter solidifying as it cools and becoming initimately united to the insole and, if desired, the adjoining margin of the upper.

In further modifications the injection of the additive may be directly into the injector barrel 13 per se, at a point near the barrel inlet and before the plastic material adopts its soft gel condition. In addition the container 40 may be one of several portable containers each containing different additives.

The invention is not to be confined to any strict conformity to the showings in the drawings but changes and modifications may be made therein so long as such changes or modifications mark no material departure from the spirit and scope of the appended claims.

We claim:

1. An apparatus for producing articles of footwear and parts thereof from plastic material, comprising a container adapted to hold ungelled plastisol under pressure and in a fluid condition, an injector, means for feeding the plastisol from the source to the injector, means for introducing fluent coloring material into the plastisol, said introducing means including a housing having a bore therein, a plunger slidably mounted in the bore, a non-return valve unit located between the bore and the means for feeding plastisol to the injector, inlet means for supplying coloring material into the bore, a container for the fluent coloring material, an outlet branch for the container adapted to be detachably connected to the inlet means, valve means in said outlet branch operative to close the outlet branch when the container is detached from the inlet means and open said branch when the container is connected to the inlet means, means for imparting injecting strokes to the plunger whereby quantities of coloring material are injected from the bore through the non-return valve unit into the means for feeding plastisol to the injector, means for mixing the plastisol and coloring material in the injector, and heating means operably associated with the injector for initially bringing the plastisol to a transient gel condition and then to a condition of a fused thermoplastic material in a liquid condition for injection into a mold.

2. The apparatus as claimed in claim 1 including means for maintaining the material in the container under pressure.

References Cited by the Examiner
UNITED STATES PATENTS

| | | | |
|---|---|---|---|
| 2,022,895 | 12/1935 | Morrell | 264—75 |
| 2,279,344 | 4/1942 | Reid | 264—77 |
| 2,470,001 | 5/1949 | Stober | 264—75 |
| 2,855,631 | 10/1958 | Rowley. | |
| 3,173,978 | 3/1965 | Olsen | 264—329 |

ROBERT F. WHITE, *Primary Examiner.*

ALEXANDER H. BRODMERKEL, *Examiner.*

J. R. DUNCAN, R. B. MOFFITT, *Assistant Examiners.*